(12) United States Patent
Ogievetsky et al.

(10) Patent No.: US 10,417,258 B2
(45) Date of Patent: Sep. 17, 2019

(54) INTERACTIVE MULTI-DIMENSIONAL NESTED TABLE SUPPORTING SCALABLE REAL-TIME QUERYING OF LARGE DATA VOLUMES

(71) Applicant: Exposit Labs, Inc., San Francisco, CA (US)

(72) Inventors: Vadim Ogievetsky, San Francisco, CA (US); Michael Driscoll, San Francisco, CA (US); Young Min Kin, Berkeley, CA (US); Elizabeth Allen, San Francisco, CA (US); Katherine Chu, Cupertino, CA (US); Ofir Oss, Kfar Saba (IL); Adam Smith, San Francisco, CA (US); Luca Candela, San Bruno, CA (US)

(73) Assignee: Exposit Labs, Inc., San Francisco, CA (US)

( * ) Notice: Subject to any disclaimer, the term of this patent is extended or adjusted under 35 U.S.C. 154(b) by 390 days.

(21) Appl. No.: 14/577,466

(22) Filed: Dec. 19, 2014

(65) Prior Publication Data
US 2015/0178339 A1    Jun. 25, 2015

Related U.S. Application Data

(60) Provisional application No. 61/918,482, filed on Dec. 19, 2013.

(51) Int. Cl.
*G06F 16/26* (2019.01)
*G06F 16/28* (2019.01)
*G06F 17/24* (2006.01)

(52) U.S. Cl.
CPC .......... *G06F 16/283* (2019.01); *G06F 16/26* (2019.01); *G06F 17/246* (2013.01)

(58) Field of Classification Search
USPC ...................................................... 707/778
See application file for complete search history.

(56) References Cited

U.S. PATENT DOCUMENTS

| | | | |
|---|---|---|---|
| 5,953,707 A | 9/1999 | Huang et al. | |
| 6,879,729 B2 | 4/2005 | Kamath et al. | |
| 7,506,243 B2 * | 3/2009 | Kotler | G06F 17/245 707/999.001 |

(Continued)

*Primary Examiner* — Cheyne D Ly
(74) *Attorney, Agent, or Firm* — Schwegman Lundberg & Woessner, P.A.

(57) ABSTRACT

Displaying a visual representation of table, including generating a visual representation of a table including a plurality of dimensions, displaying the visual representation of the table, where a first dimension value corresponding to one of the plurality of dimensions is collapsed when the table is initially generated, and a second dimension value corresponding to one of the plurality of dimensions is expanded such that sub-dimension values for the first dimension value are not visible, and sub-dimension values for the second dimension value are visible, detecting that a user has placed a first dimension value manipulator corresponding to said first dimension value into an expand mode, and in response to detecting the first dimension value manipulator is in an expand mode, expanding the first dimension value in the displayed visual representation of the table such that the sub-dimension values for the first dimension value are visible.

17 Claims, 8 Drawing Sheets

(56) References Cited

U.S. PATENT DOCUMENTS

| | | | |
|---|---|---|---|
| 7,568,211 B2 | 7/2009 | Mai et al. | |
| 7,747,465 B2 | 6/2010 | Srinivasan et al. | |
| 7,761,346 B2 | 7/2010 | Cooper et al. | |
| 7,925,989 B2* | 4/2011 | Hofmann | G06F 17/212 715/793 |
| 8,112,425 B2 | 2/2012 | Baum et al. | |
| 8,204,301 B2 | 6/2012 | Xiao et al. | |
| 8,515,862 B2 | 8/2013 | Zhang et al. | |
| 9,002,854 B2 | 4/2015 | Baum et al. | |
| 9,069,824 B2 | 6/2015 | Pompey et al. | |
| 9,508,082 B1 | 11/2016 | Mannix et al. | |
| 9,524,223 B2 | 12/2016 | Brew | |
| 2002/0038384 A1* | 3/2002 | Khan | H04L 41/22 709/245 |
| 2002/0099600 A1 | 7/2002 | Merriman et al. | |
| 2003/0026493 A1 | 2/2003 | Kamath et al. | |
| 2005/0028188 A1 | 2/2005 | Latona et al. | |
| 2006/0282771 A1* | 12/2006 | Vinci | G06F 17/2247 715/209 |
| 2007/0260582 A1* | 11/2007 | Liang | G06F 16/2423 |
| 2007/0300144 A1* | 12/2007 | Naick | G06F 17/246 715/212 |
| 2008/0117213 A1 | 5/2008 | Cirit et al. | |
| 2008/0282189 A1* | 11/2008 | Hofmann | G06F 17/212 715/793 |
| 2009/0119172 A1 | 5/2009 | Soloff | |
| 2009/0319543 A1* | 12/2009 | Danton | G06F 17/30572 |
| 2010/0082705 A1 | 4/2010 | Ramesh et al. | |
| 2010/0205024 A1 | 8/2010 | Shachar et al. | |
| 2011/0119100 A1 | 5/2011 | Ruhl et al. | |
| 2011/0218978 A1 | 9/2011 | Hong et al. | |
| 2012/0109917 A1* | 5/2012 | Comeau | G06F 17/30371 707/703 |
| 2013/0103657 A1 | 4/2013 | Ikawa et al. | |
| 2013/0123131 A1 | 5/2013 | Purvis et al. | |
| 2013/0150253 A1 | 6/2013 | Deciu et al. | |
| 2014/0078163 A1 | 3/2014 | Cammert et al. | |
| 2014/0101093 A1 | 4/2014 | Lanphear et al. | |
| 2014/0108640 A1 | 4/2014 | Mathis | |
| 2014/0122022 A1 | 5/2014 | Chen et al. | |
| 2014/0172867 A1 | 6/2014 | Lin et al. | |
| 2014/0279824 A1 | 9/2014 | Tamayo | |
| 2014/0279927 A1 | 9/2014 | Constantinescu et al. | |
| 2014/0280032 A1 | 9/2014 | Kornacker et al. | |
| 2014/0324745 A1 | 10/2014 | Leppanen et al. | |
| 2015/0007115 A1* | 1/2015 | Kleser | G06F 3/0484 715/854 |
| 2015/0032775 A1 | 1/2015 | Yang et al. | |
| 2015/0033086 A1 | 1/2015 | Sasturkar et al. | |
| 2015/0073894 A1 | 3/2015 | Leaute et al. | |
| 2015/0112874 A1 | 4/2015 | Serio et al. | |
| 2015/0120749 A1 | 4/2015 | Phanishayee et al. | |
| 2015/0186434 A1 | 7/2015 | Eichinger et al. | |
| 2015/0379050 A1 | 12/2015 | Yanacek et al. | |
| 2015/0379065 A1 | 12/2015 | Yoshizawa et al. | |
| 2016/0147583 A1 | 5/2016 | Ben Simhon et al. | |
| 2016/0253381 A1 | 9/2016 | Kim et al. | |
| 2017/0178309 A1 | 6/2017 | Rakhshanfar et al. | |
| 2017/0220938 A1 | 8/2017 | Sainani et al. | |
| 2017/0230229 A1 | 8/2017 | Sasturkar et al. | |

* cited by examiner

| | A | B | C | D |
|---|---|---|---|---|
| | Region Sold in | Shirt Size | Units Sold | Price per Unit |
| 1 | North | L | 230 | $35 |
| 2 | North | L | 123 | $35 |
| 3 | South | XL | 15 | $40 |
| 4 | East | S | 72 | $25 |
| 5 | South | M | 1,020 | $30 |
| 6 | West | M | 1,784 | $30 |
| 7 | West | L | 400 | $35 |
| 8 | North | L | 300 | $35 |
| 9 | East | XL | 20 | $40 |
| 10 | South | M | 950 | $30 |

FIG. 1A
(Prior Art)

| | A | B | C |
|---|---|---|---|
| 1 | Row Labels | Sum of Units Sold | Sum of Price per Unit |
| 2 | East | 92 | 65 |
| 3 | S | 72 | 25 |
| 4 | XL | 20 | 40 |
| 5 | North | 653 | 105 |
| 6 | L | 653 | 105 |
| 7 | South | 1985 | 100 |
| 8 | M | 1970 | 60 |
| 9 | XL | 15 | 40 |
| 10 | West | 2184 | 65 |
| 11 | L | 400 | 35 |
| 12 | M | 1784 | 30 |
| 13 | Grand Total | 4914 | 335 |

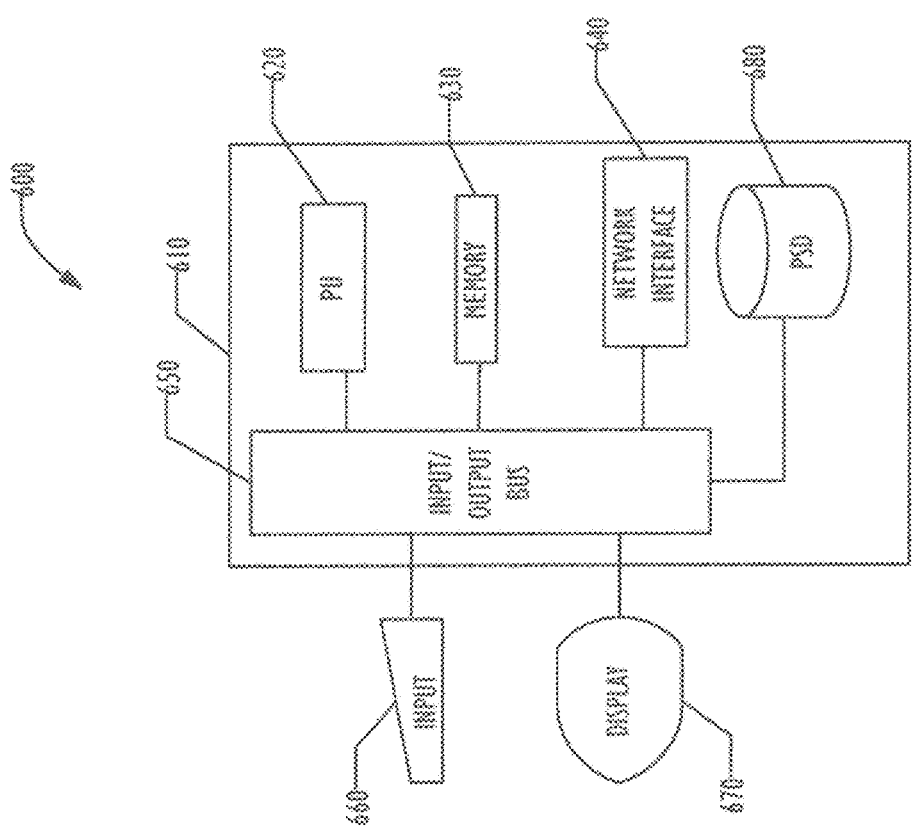

INTERACTIVE MULTI-DIMENSIONAL NESTED TABLE SUPPORTING SCALABLE REAL-TIME QUERYING OF LARGE DATA VOLUMES

TECHNICAL FIELD

This disclosure relates generally to a system, apparatus, and method for displaying a multi-dimensional nested table that can support scalable real-time querying of large data volumes and visualization of the results of the data query. Data from a multi-dimensional nested table is displayable in such a manner that data corresponding to a particular dimension or dimensions of data are expandable and collapsible via a sub-manipulator, and where less than all of the data corresponding to a particular dimension or dimensions are initially displayed.

BACKGROUND

In the current information age there are various forms of tables for visualizing data from a database. One such data visualization tool is a basic data table. A basic data table is comprised of rows and columns of information, which often times includes numerical calculations based on the combination of certain rows and columns of information. A basic EXCEL® data table 100a is illustrated in FIG. 1A which is populated with information relating to the sale of shirts. As shown in the table, there are four columns: "Region Sold In" 102, "Shirt Size" 104, "Units Sold" 106, and "Price per Unit" 108. There are four regions a user can input for each row in the region column 102: "North," "South," "East," and "West." There are four shirt sizes a user can input for each row under the shirt size column 104: "S," "M," "L," "XL." A significant problem with basic data tables, like the one shown in FIG. 1A, are that they do not allow a user to efficiently summarize desired data. For example, if a user wants summarize the revenue and number of units sold, organized based on region and shirt size, an individual would be required to manually calculate the desired data summary. A data summarization tool referred to as a "pivot table" is well known in the prior art and allows an individual to more efficiently summarize such data. Specifically, an example of a pivot table 100b created in EXCEL® based on the table from FIG. 1A is illustrated in FIG. 1B. As shown in FIG. 1B, a pivot table 100b is created summarizing the revenue and number of units sold based on region and shirt size. In the context of pivot tables, the columns that represent "annotation" data that can be used to subdivide data can be referred to as "dimensions." In reference to FIG. 1A, the dimensions are the region column 102 and the shirt size column 104. Column 104 is a sub-dimension of column 102, because dimension 102 is higher in the dimension hierarchy than dimension 104. In other words, the shirts are organized based on region first, and then shirt size. Each dimension has corresponding values. For example, "North, "South," "East" and "West" 114 are the values corresponding to the region dimension 102. "S," "M," "L," and "XL," 116 are the values corresponding to the size dimension 104. "Metrics" are columns of (generally numerical) "fact" data that can be used in aggregation functions. In reference to FIG. 1A, the metrics are the units sold column 106 and the price per unit column 108. As shown in FIG. 1B, the metrics corresponding to each dimension value in FIG. 1A are used to calculate the Sum of Units Sold 110 and Sum of Price Per Unit 112. The dimensions of FIG. 1A are used to organize the data in a particular manner. More specifically, the dimensions 102 and 104 are used to organize the sum of units sold 110 and sum of price per unit 112 by region and shirt size. While pivot tables such as those in EXCEL® are particularly useful when used in conjunction with tables containing many columns and rows of data, there is at least one inherent disadvantage to the EXCEL® pivot table: When a user is viewing a pivot table based on multiple dimensions and thousands of rows of information, the user may become overwhelmed by the sheer volume of the data. Yet another disadvantage of prior art pivot tables is that it is not simple and efficient to modify the pivot table dimensional hierarchy. For example, a user may have to regenerate the pivot table entirely to add additional dimensions to the data summary.

In the context of data summary tools hosted on servers, database size and query speed can become of particular concern at least because of: (1) the additional time that may be required to load the visual representation of the pivot tables because of bandwidth limitations; and (2) the fact that data summary tools hosted on servers tend to be based on large and complex databases. Web based data summarization tables (hereinafter "web tables") are known in the prior art and operate in a manner similar to pivot tables in that they include dimensions and metrics which are used to summarize data for a user. Web tables may be hosted on a local server or remote server (e.g., one hosted on the Internet) and may be directly linked to an online data base that can be edited in real time by hundreds or even thousands of users. The web table may also be linked directly to another database and configured to summarize data in real-time based on the database. Consequently, the web table is capable of being constantly updated based on information entered by users in remote locations or by automation. Web tables often times include massive amounts of data, including tens of dimensions and thousands of rows of information. Consequently, the time required to query information in a web table, as well as the amount of time required to display that information to a user, can be significant. Additionally, the amount of data may very well overwhelm a user given the sheer volume of information being queried and displayed. A web table 200 is illustrated in FIG. 2, which includes two dimensions, Publisher 202 and Country 204, and metrics 206-212. As compared to the pivot tables in FIGS. 1A-B, there are significantly more rows and columns of information in the web table 200. While all of the data corresponding to sub-dimension 204 is displayed, a user may not be interested in the particular details outside of the top three revenue generating countries (i.e., "United States," "Spain," and "Netherlands") for each dimension value 214a-214d. Additionally, the more data that is initially displayed in a web table, the longer it takes a user to query and display that information. Given the massive amount of data included in many web tables, they are often not generated in real time due to the querying and display restraints.

Consequently, there remains a need for a method, system, and apparatus for querying and displaying data in real-time in a manner that does not overwhelm the user or require a significant amount of querying and display time. There further remains a need to display data that is of particular importance to a user, while minimizing the amount of data displayed that is not of particular importance. There further remains a need for an individual to be able select specific rows of information in a web table and summarize the metrics corresponding to the selected rows of information.

BRIEF DESCRIPTION OF THE DRAWINGS

FIG. 1A illustrates a prior art basic data table generated using EXCEL®.

FIG. 1B illustrates a prior art basic pivot table generated using EXCEL®.

Figure 2:
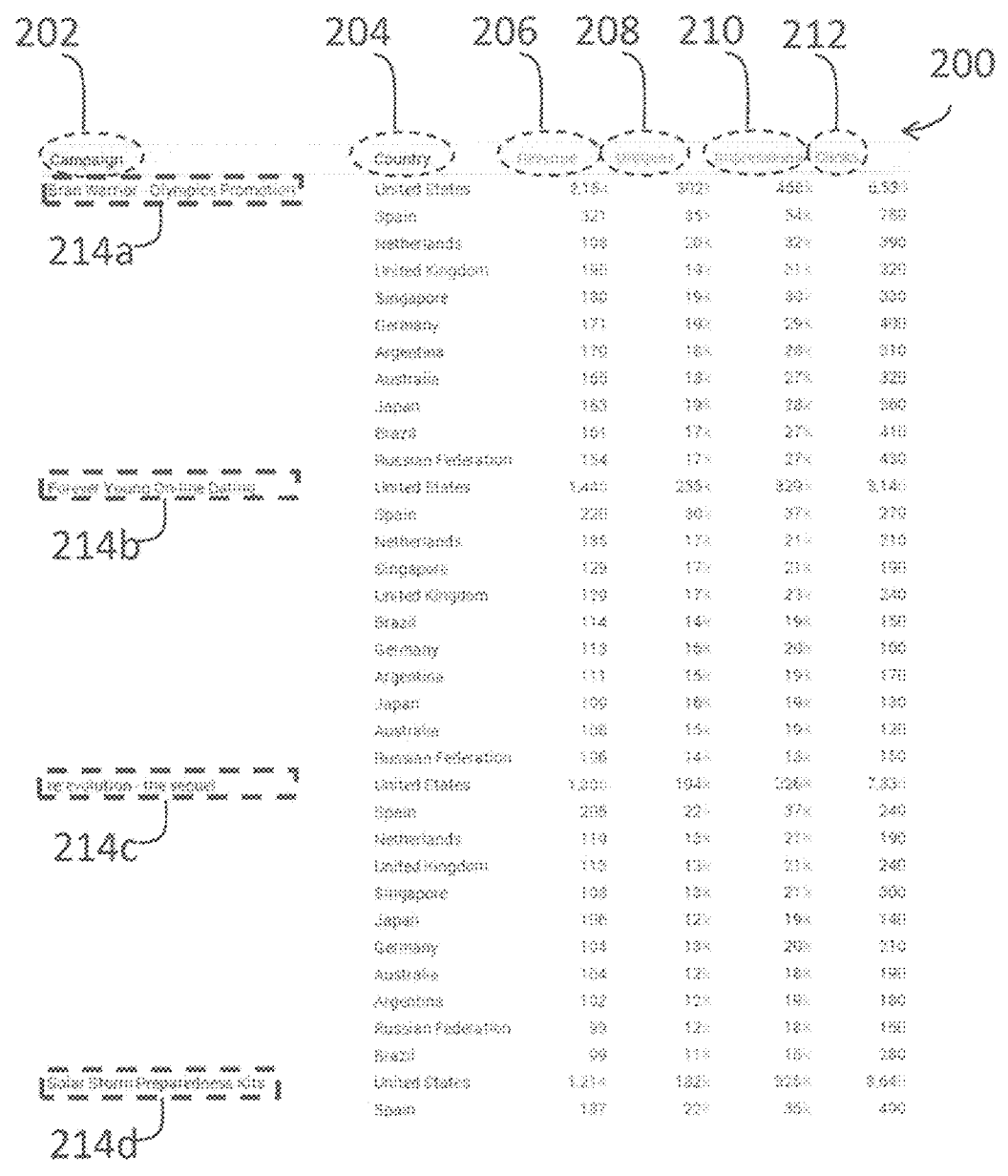

FIG. 2 illustrates a prior art web based table.

FIG. 4 illustrates an example multi-dimensional nested table according to one or more disclosed embodiments wherein rows of information desired to be summarized can be selected by a user and summarized.

FIG. 6 is a block diagram illustrating a computer with a processing unit configured to facilitate one or more functional components according to one or more disclosed embodiments.

DETAILED DESCRIPTION

Figure 3:
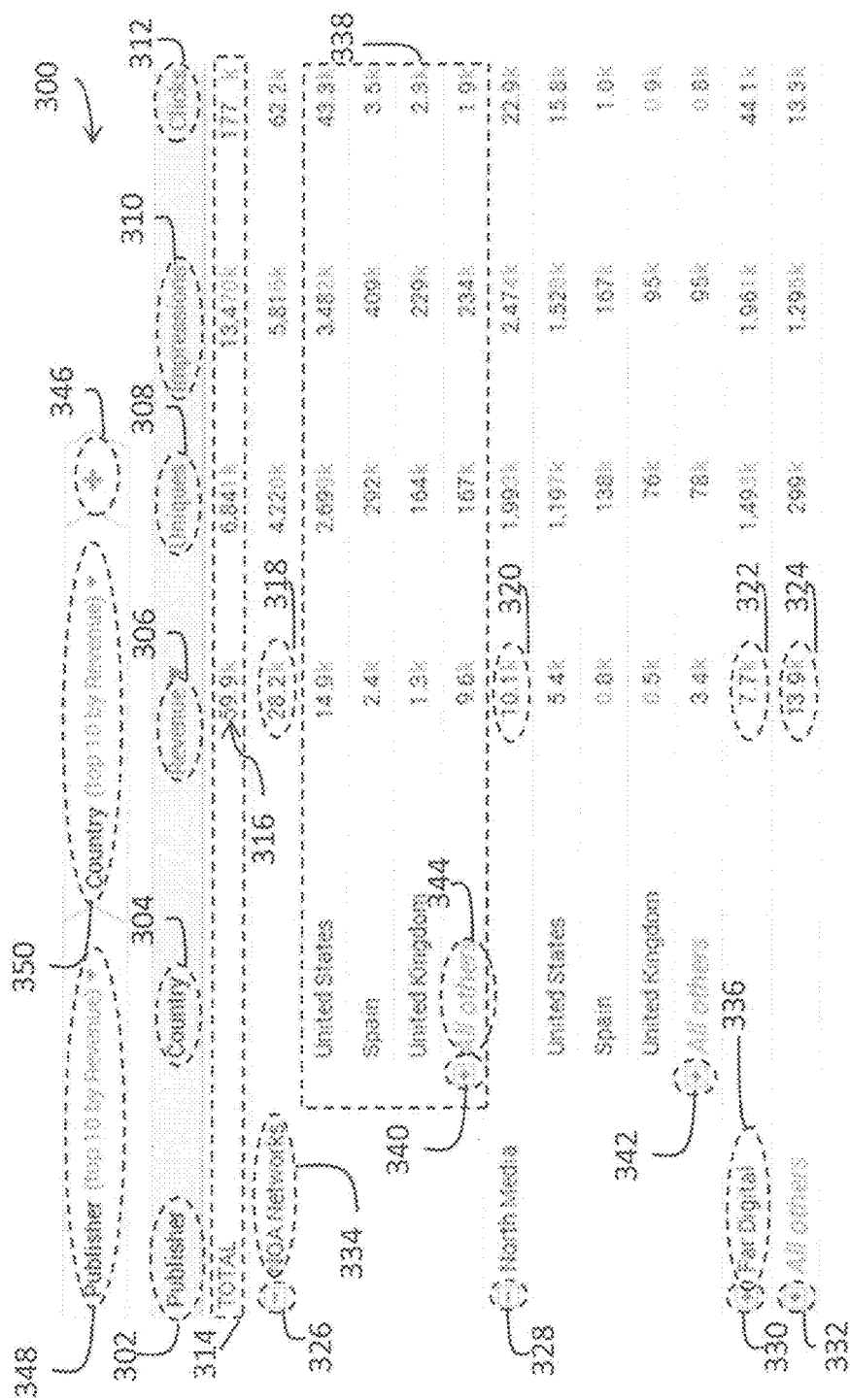
FIG. 3 illustrates an example multi-dimensional nested table according to one or more disclosed embodiments, wherein sub-dimension data is initially collapsed but is expandable at the discretion of a user by utilizing sub-manipulators.

Referring to FIG. 3, a visual representation of a multi-dimensional nested table 300 is illustrated according to one embodiment of the present invention. The nested table 300 may be generated on a local computer or a computer hosted on a remote network, such as the Internet. In one or more embodiments, the table may be generated using data stored on a local computer, or a computer hosted on a remote network. A user computer for use in accordance with the present invention may be comprised of a central processing unit (CPU), memory (e.g., SDRAM), hard drive, input/output bus, keyboard, mouse, display unit, network interface card, and power supply unit. If the nested table 300 is hosted on a remote server, a user may access the nested table 300 via a network interface card or similar device. The remote server may also have a central processing unit, memory (e.g., SDRAM), hard drive, input/output bus, keyboard, mouse, display unit, network interface card, and power supply unit. A detailed description of the graphic user interface (GUI) of the nested table 300 is discussed below.

The multi-dimensional nested table 300 is comprised of two dimensions: "Publisher" 302 and "Country" 304. While "Publisher" 302 and "Country" 304 are both dimensions, only "country" 304 is a sub-dimension in the illustrated configuration because it is a secondary dimension 304 to dimension 302. The hierarchy of dimensions in nested table 300 may be configured in any manner desired by a user. For example, the hierarchy of nested table 300 may be rearranged such that "Publisher" 302 is a sub-dimension of "Country" 304. In one or more embodiments, the hierarchy of the dimensions determines how the data related to those dimensions is displayed, or whether the data is displayed. There are no limitations or restrictions regarding how a user may reconfigure the hierarchy of dimensions, even if such hierarchy causes the nested table to display data organized in a nonsensical fashion.

The nested table 300 is also comprised of four metrics: "Revenue" 306, "Uniques" 308, "Impressions" 310, and "Clicks" 312. As would be apparent to one of ordinary skill in the art, any number of dimensions and metrics can be incorporated into the nested table 300 interface. A calculated total value 314 for each metric 306-312 is displayed on the top row 314 of the table 300 based on the sum of the metrics corresponding to the values of each dimension 302 value. For example, the calculated value 316 in the top row 314 for the metric "Revenue" 306 is based on the aggregation of the metrics 318, 320, 322, and 324 which correspond to the dimension 302 values. While the calculated value 316 is based on a summation of metric values in the illustrated embodiment, those having ordinary skill in the art would understand that any type of calculation could be performed using the metrics. For example, instead of aggregating the metric values, the average of the metric values could be calculated. Each value of dimension 302 includes a manipulator 326-330, such as manipulator 326 next to publisher value 334 (i.e., "NOA Networks"). The manipulator may appear as a "+" or "-" symbol, where a "+" indicates that the sub-dimension values 338 corresponding to dimension value 334 may be expanded from a collapsed mode, and a "-" indicates that the sub-dimension values 338 may be collapsed from an expanded mode. While "+" and "-" symbols represent the manipulators in FIG. 3, it will be apparent to those of ordinary skill in the art that any symbol or character may be used to represent a manipulator. The manipulator 326 may be selected by a user to expand or collapse sub-dimension values 338 and their metrics corresponding to dimension value 334. For instance, sub-dimension values 338 "United States," "Spain," "United Kingdom" and "All Others" are displayed in expanded mode for dimension value 334. A user may select the manipulator "-" 326 corresponding to dimension value 334 and collapse the sub-dimension values 338 and their metrics, such that none of the sub-dimension values 338 and their corresponding metrics are displayed to the user. Likewise, manipulator 330 corresponding to dimension value 336 may be selected by a user to expand the sub-dimension values and their metrics corresponding to value 336.

While FIG. 3 illustrates a two dimension nested table, those having ordinary skill in the art would understand that the utilization of manipulators may be applied to any number of dimensions. It will also be understood by those having ordinary skill in the art, that all dimensions may be initially displayed in collapsed mode, which reduces the number of values initially displayed to the user such that the user may not be overwhelmed with information. In an alternative embodiment, the top three revenue generating dimension values "NOA Networks," "North Media" and "Far Digital" may be initially displayed in expanded mode, while all remaining dimension values may be in collapsed mode. A person having ordinary skill in the art would understand that the embodiments described herein can be configured to display any number of dimension values based on any criteria. For example, rather than displaying the top three revenue generating dimension values in expanded mode, the lowest five revenue generating dimension values may be displayed in expanded mode instead. Further, if the hierarchies of the dimensions are modified when one dimension becomes more pertinent, then the top three, bottom three, etc., may change. Consequently, a user may have the capability to manipulate the table 300 to show information of importance to the user, while collapsing or hiding information that is not of particular importance.

Yet another feature of nested table 300 is the utilization of sub-manipulators, 332, 340 and 342. Like manipulators 326-330, sub-manipulators may be utilized to expand or collapse dimension values at the discretion of the user. However, a sub-manipulator can allow a user to expand or collapse dimension values within the same dimension as the sub-manipulator itself. For example, sub-manipulator 332 may be selected to expand dimension 302 to show additional dimension values 408 for dimension 302. However, when manipulator 326 is selected only sub-dimension values 338 corresponding to sub-dimension 304 are expanded or collapsed. The displayed metrics corresponding to collapse sub-dimension value 344 in FIG. 3 are based on the aggregation of the metrics corresponding to expanded sub-dimension values 402 in FIG. 4.

Figure 4:
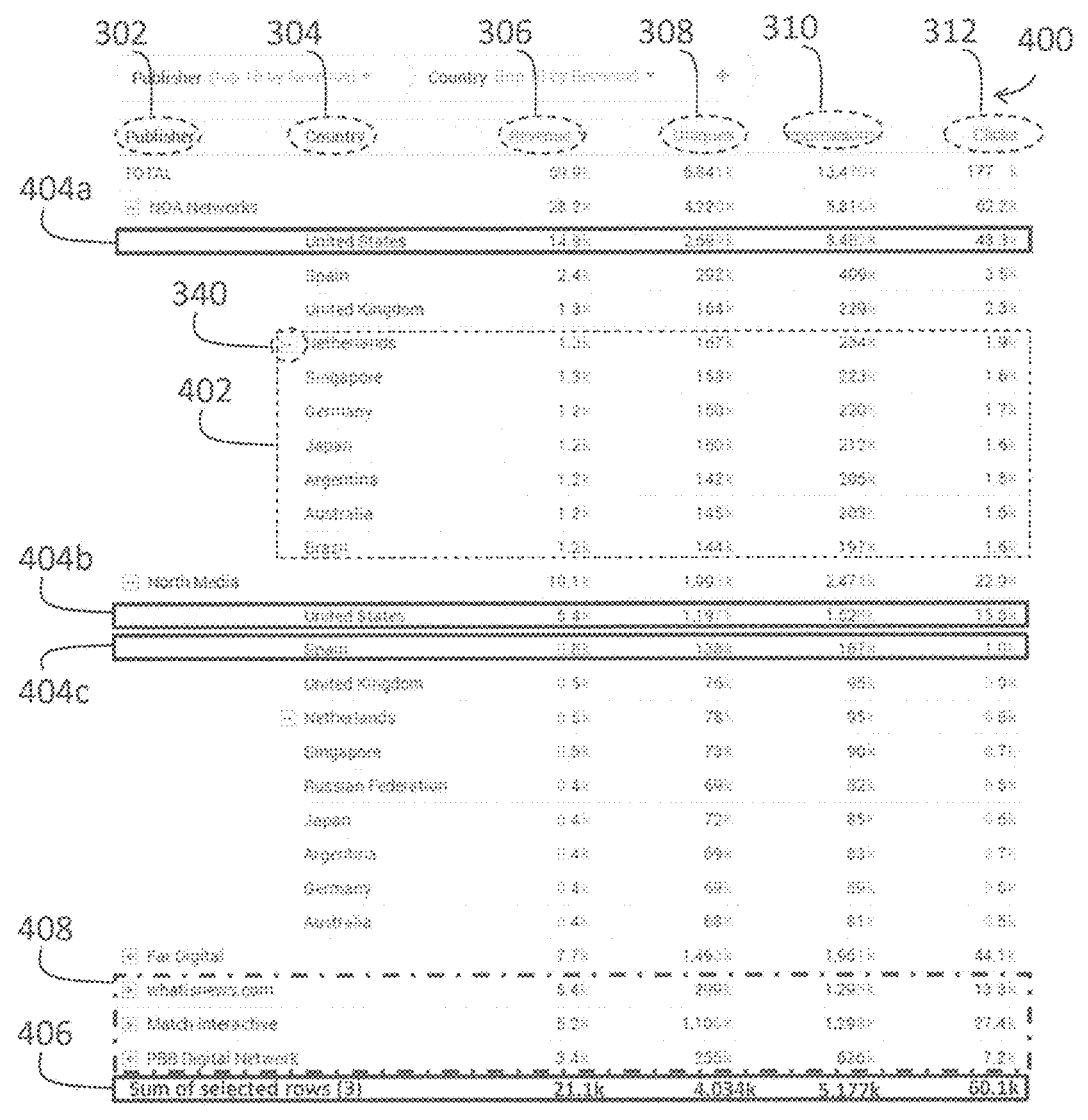

Referring to both FIGS. 3 and 4, once a user selects sub-manipulator 340, the collapsed sub-manipulator values and metrics 402 corresponding to collapsed sub-dimension value 344 are displayed. If a user selects sub-manipulator 340 while in expanded mode, the sub-manipulator values and metrics 402 will collapse again. It will also be understood by those having ordinary skill in the art that all sub-manipulator values may be initially displayed in collapsed mode, which can reduce the number of values initially displayed to the user such that the user may not be overwhelmed with unwanted information. Alternatively, a filter may be applied by the user which initially displays the dimension values corresponding to the top three revenue generating dimension 302 values in expanded mode, while all other values are collapsed by a sub-manipulator. Of course, other kinds of filters may be applied to configure the table to initially display certain dimension values, while other dimension values are collapsed into a sub-manipulator. Also, sub-manipulators can be particularly advantageous because they can allow a user to view data corresponding to dimension values that are of particular significance, while at the same time hiding data corresponding to dimension values that may not be of particular importance to the user. Moreover, the use of sub-manipulators can reduce the amount of data displayed to the user and can reduce query and display times.

Turning to FIG. 4, the nested table 400 allows for a user to select multiple rows of information and perform a calculation based on the metrics corresponding to the selected rows. For example, a user may select rows 404a-404c and the sum of the metrics of the selected rows are then tallied at the bottom of the GUI in row 406. The user may select the rows by, for example, holding a keyboard modifier such as the alt, command, shift, or control key, and clicking any dimension value to display a calculation based on metrics of the selected dimension values. It would be understood by one of ordinary skill in the art that any calculation may be made based on the selected rows. For example, instead of summing the metrics of the selected rows, the user may take the median or average metrics of the selected rows. This feature may allow a user to quickly summarize selected data, when summarizing the data would otherwise require manual calculations by the user.

Yet another feature of the nested table 300 is the ability of a user to seamlessly add or subtract additional dimensions to the nested table 300. For example, a user may elect to add the additional dimension "Ad Size" to the table displayed in FIG. 3. The user may add additional dimensions, such as "Ad Size," by selecting manipulator 346 and selecting the dimension (e.g., "Ad Size") desired to be added by the user. Use of a manipulator 346 may allow a user to seamlessly and quickly add additional dimensions to the nested table 300. This feature further can allow users to near-instantaneously apply multi-level filters to the table to hone in on the specific subset of data the users are most interested in analyzing without the need to completely recreate the table. A user may add additional filters using manipulator 346 as well. For example, a user may choose to add a "top 10 by revenue" filter for a particular dimension. In that case, only the top 10 revenue generating dimension values would be displayed. It would be understood by one having ordinary skill in the art that any criteria could be utilized for such a filter, such as "bottom 10 by revenue" as opposed to top 10.

A user may also reconfigure the hierarchy of dimensions in the nested table 300. For example, a user may select element 348 corresponding to the "Publisher" dimension 302 and drag it to the right of element 350 corresponding to the "Country" dimension 304. Conversely, a user may select element 350 corresponding to the "Country" dimension 304 and drag it to the left of element 348 corresponding to the "Publisher" dimension 302. As a result, the nested table 300 will be rearranged such that the data is summarized first by dimension 304 and then by dimension 302. Dimension 302 would then be a sub-dimension to dimension 304. Those of ordinary skill in the art would recognize that any number of elements corresponding to a particular dimension may be rearranged by dragging the elements to a particular location on the user's display. This feature can allow a user to quickly and easily rearrange the hierarchy of the dimensions in a nested table.

Figure 5A:
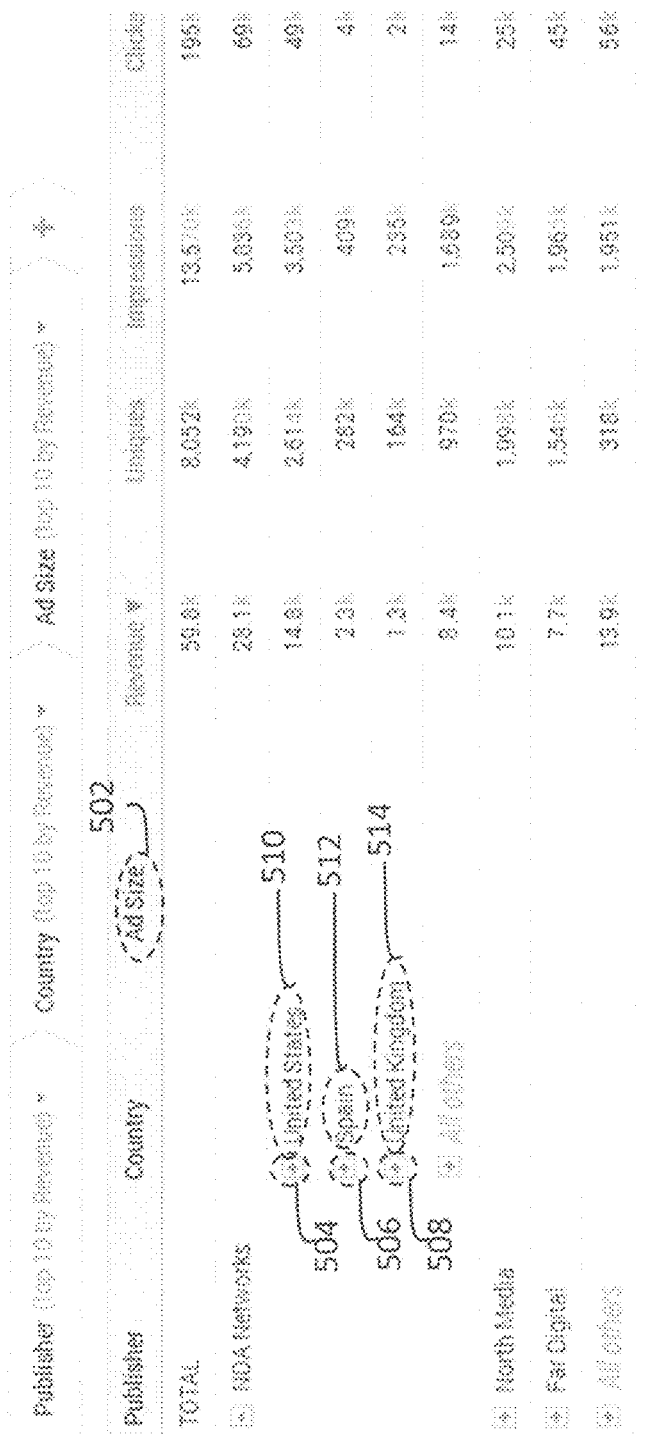
FIGS. 5A and 5B illustrate example multi-dimensional nested tables according to one or more disclosed embodiments, wherein additional dimensions can be added utilizing a manipulator.

Turning now to FIG. 5A, once the "Ad Size" dimension 502 has been added, sub-manipulators 504-508 are displayed. Sub-manipulator 504 corresponds to sub-dimension value 510 (i.e., "United States"), while sub-manipulator 506 corresponds to sub-dimension value 512 (i.e., "Spain") and sub-manipulator 508 corresponds to sub-dimension value 514 (i.e., "United Kingdom"). Each sub-dimension value 510-514 is initially displayed in collapsed mode. If a user desires to view additional summary data corresponding to any of sub-dimension values 510-514, the user may simply select one of the manipulators 504-508 to expand the collapsed data.

Figure 5B:
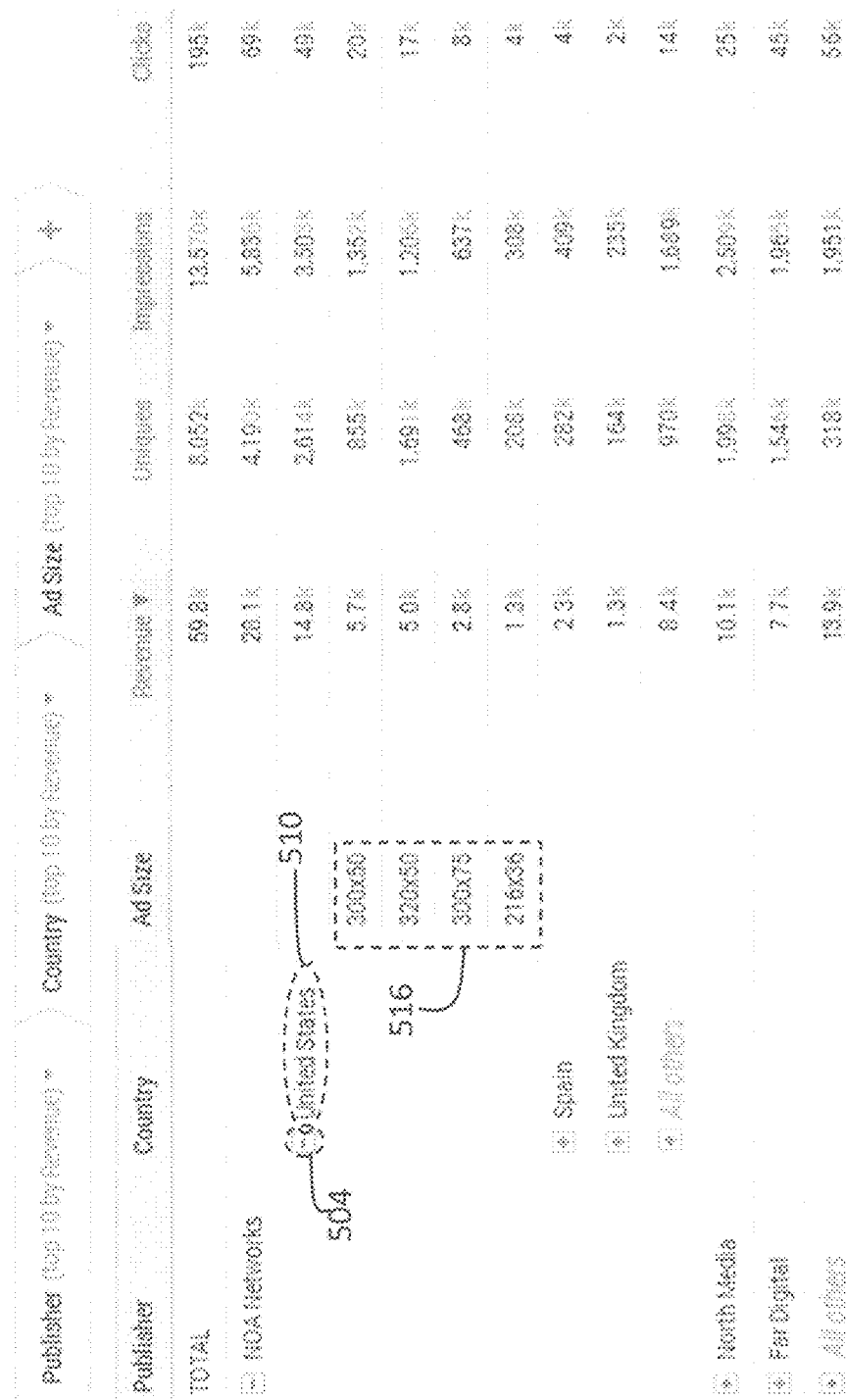

Turning to the example of FIG. 5b, if a user selects manipulator 504, the sub-dimension values 516 corresponding to sub-dimension value 510 are expanded and displayed in the table. By initially hiding sub-dimension values 516, the user may be less likely to be overwhelmed with summarized data. Moreover, less time may be required to query and load the summarized data in the table. While FIG. 5b does not illustrate sub-manipulators corresponding to each of sub-dimension values 516, one having ordinary skill in the art would recognize that sub-manipulators could be implemented at any dimension level in a nested table. Importantly, the nested table 300 may operate in real time, therefore all changes implemented in the database are displayed in the nested table as they occur.

Yet another feature of the nested table 300 is the ability to display only the subset of data that meets a specific criteria and hide data that does not fit that criteria using a filter. Such filters may automatically be applied each time the nested table 300 table is reconfigured, for example when the hierarchy of dimensions is rearranged as discussed in ¶ 0019. Such filters may be, for example, filters based on text so that a user may filter the table based on a specific text value. A user may, for instance, desire to only see data from the table corresponding to a particular country such as the "United States", so the text filter value entered by the user would be "United States." The nested table 300 would then only display data corresponding to the United States and hide all other data. Similarly, a user may only desire to see a particular metric, such as "Revenue" 306. In that case, a user would utilize the "Revenue" 306 metric as the filter and only the revenue for each dimension would be displayed. Those of ordinary skill in the art would recognize that there are a countless number of types of filters known in the art that may be applied to the nested table 300, such as filters for date or time if such values are part of the nested table summary. It would also be recognized that the filters may be additive, meaning that additional filters may be used and that each additional filter may be based on the current filter, thereby reducing the amount of data displayed in the table.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

Referring now to FIG. 6, an example processing device 600 for use in providing disclosed data display techniques according to embodiments is illustrated in block diagram form. Processing device 600 may serve as processor in a gateway or router, client computer, or a server computer. Example processing device 600 comprises a system unit 610 which may be optionally connected to an input device for system 660 (e.g., keyboard, mouse, touch screen, etc.) and display 670. A program storage device (PSD) 680 (sometimes referred to as a hard disc, flash memory, or computer readable medium) is included with the system unit 610. In one or more embodiments, the PSD stores data from which a table, such as a nested table, may be generated. Also included with system unit 610 is a network interface 640 for communication via a network (either wired or wireless) with other computing and corporate infrastructure devices (not shown). Network interface 640 may be included within system unit 610 or be external to system unit 610. In either case, system unit 610 will be communicatively coupled to network interface 640. Program storage device 680 represents any form of non-volatile storage including, but not limited to, all forms of optical and magnetic memory, including solid-state, storage elements, including removable media, and may be included within system unit 610 or be external to system unit 610. Program storage device 680 may be used for storage of software to control system unit 610, data for use by the processing device 600, or both. In one or more embodiments, program storage device 680 includes computer-executable instructions stored therein that are executable by a processing unit.

System unit 610 may be programmed to perform methods in accordance with this disclosure. System unit 610 comprises one or more processing units (represented by PU 620), input-output (I/O) bus 650, and memory 630. Memory access to memory 630 can be accomplished using the communication bus 650. Processing unit 620 may include any programmable controller device including, for example, a mainframe processor, a cellular phone processor, or one or more members of the INTEL ATOM®, CORE®, PENTIUM® and CELERON® processor families from Intel Corporation and the CORTEX® and ARM® processor families from ARM Limited Corporation. (INTEL®, INTEL ATOM®, CORE®, PENTIUM®, and CELERON® are registered trademarks of the Intel Corporation. CORTEX® is a registered trademark of the ARM Limited Corporation. ARM® is a registered trademark of the ARM Limited Company). In one or more embodiments, processing unit 620 follow a program sequence of computer-executable instructions, such as instructions stored in the storage device 680. In one or more embodiments, PU 620 may be configured to perform instructions, such as generating a visual representation of a table based on data stored, for example, on program storage device 680 or some other storage device; causing to be displayed on display device 670, detecting that a user has placed a first dimension value manipulator corresponding of the first dimension value into an expand mode, and in response, expanding the first dimension value in the displayed visual representation of the table such that the sub-dimension values for the first dimension value are visible. In this manner, processing unit (PU) 620 is transformed during execution of the instructions. Further, display 670 is also transformed to display the changing graphical user interface that includes the visual representation of the table.

Display 670 may be any kind of display device that connects to a computer system. For example, display 670 may include a cathode ray tube (CRT) display, plasma display, liquid crystal display (LCD), light-emitting diode (LED) display, or any other kind of display device. Memory 630 may include one or more memory modules and comprise random access memory (RAM), read only memory (ROM), programmable read only memory (PROM), programmable read-write memory, and solid-state memory. PU 620 may also include some internal memory including, for example, cache memory or memory dedicated to a particular processing unit and isolated from other processing units for use in data display techniques used, for example, to display data on display 670.

Processing device 600 may have resident thereon any desired operating system. Embodiments of disclosed data display techniques may be implemented using any desired programming language, and may be implemented as one or more executable programs, which may link to external libraries of executable routines that may be supplied by the provider of the data display software/firmware, the provider of the operating system, or any other desired provider of suitable library routines. As used herein, the term "a computer system" can refer to a single computer or a plurality of computers working together to perform the function described as being performed on or by a computer system.

In preparation for performing disclosed embodiments on processing device 600, program instructions to configure processing device 600 to perform disclosed embodiments may be provided stored on any type of non-transitory computer-readable media, or may be downloaded from a server onto program storage device 680. It is important to note that even though PU 620 is shown on a single processing device 600 it is envisioned and may be desirable to have more than one processing device 600 in a device configured according to disclosed embodiments.

It is to be understood that the above description is intended to be illustrative, and not restrictive. For example, the above-described embodiments may be used in combination with each other. Many other embodiment will be apparent to those of skill in the art upon reviewing the above description. The scope of the invention should therefore should be determined with reference to the appended claims, along with the full scope of equivalents to which such claims are entitled.

What is claimed is:

1. A non-transitory computer readable storage medium or media having computer-executable instructions stored therein that when executed cause a machine to perform operations comprising:
    generating a visual representation of a table based on stored data, the table including a plurality of dimensions;
    causing display of the visual representation of the table, wherein a first dimension value corresponding to a first dimension of the plurality of dimensions is collapsed when the table is initially generated, and a second dimension value corresponding to the first dimension of the plurality of dimensions is expanded when the table is initially generated, such that sub-dimension values for the first dimension value are not visible, and sub-dimension values for the second dimension value are visible, the sub-dimension values for the first dimension value and the sub-dimension values for the second dimension value corresponding to a second dimension of the plurality of dimensions, wherein the second dimension is a sub-dimension of the first dimension;
    detecting a user input modifying a hierarchical relationship between the first and the second dimensions;
    in response to detecting the user input, generating a rearranged hierarchy of the plurality of dimensions, the first dimension being a sub-dimension of the second dimension in the rearranged hierarchy; and
    changing which sub-dimension values are visible based on the rearranged hierarchy of the plurality of dimensions;
    generating a metric value calculated based on the sub-dimension values of the first dimension value;
    displaying the metric value corresponding to the first dimension value in the visual representation of the table;
    detecting that a user has placed a first dimension value manipulator corresponding to the first dimension value into an expand mode; and
    in response to detecting the first dimension value manipulator is in the expand mode, expanding the first dimension value in the displayed visual representation of the table such that the sub-dimension values for the first dimension value are visible.

2. The computer readable storage medium or media of claim 1, wherein when the table is initially generated, the sub-dimension values for the second dimension value that are visible are a first subset of all sub-dimension values for the second dimension value, the first subset including the sub-dimension values for the second dimension value that are determined to satisfy a predetermined relevancy threshold.

3. The computer readable storage medium or media of claim 2, the operations further comprising:
    detecting that a sub-manipulator, corresponding to the sub-dimension values for the second dimension value, is in an expand mode; and
    in response to detecting that the sub-manipulator is in the expand mode, displaying all the sub-dimension values for the second dimension value in the visual representation of the table.

4. The computer readable storage medium or media of claim 1, the operations further comprising:
    receiving a request from a user via the visual representation of the table to add a dimension to the visual representation of the table; and
    in response to the request to add a dimension, adding an additional dimension and at least one additional manipulator that allows a user to manipulate the visual representation of the table based on the additional dimension.

5. The computer readable storage medium or media of claim 2, wherein changing which sub-dimension values are visible based on the rearranged hierarchy of the plurality of dimensions includes displaying a second subset of the sub-dimension values for the second dimension value.

6. The computer readable storage medium or media of claim 1, the operations further comprising:
    receiving user input indicating a selection of at least two rows of the table;
    dynamically performing a calculation based on data in the at least two rows; and
    displaying a result of the calculation in the visual representation of the table.

7. A method for displaying a visual representation of a table, comprising:
    generating a visual representation of a table based on stored data, the table including a plurality of dimensions;
    causing display of the visual representation of the table, wherein a first dimension value corresponding to a first dimension of the plurality of dimensions is collapsed when the table is initially generated, and a second dimension value corresponding to the first dimension of the plurality of dimensions is expanded when the table is initially generated, such that sub-dimension values for the first dimension value are not visible, and sub-dimension values for the second dimension value are visible, the sub-dimension values for the first dimension value and the sub-dimension values for the second dimension value corresponding to a second dimension of the plurality of dimensions, wherein the second dimension is a sub-dimension of the first dimension;
    detecting a user input modifying a hierarchical relationship between the first and the second dimensions;
    in response to detecting the user input, generating a rearranged hierarchy of the plurality of dimensions, the first dimension being a sub-dimension of the second dimension in the rearranged hierarchy; and
    changing which-sub-dimension values are visible based on the rearranged hierarchy of the plurality of dimensions;
    generating a metric value calculated based on the sub-dimension values of the first dimension value;
    displaying the metric value corresponding to the first dimension value in the visual representation of the table;
    detecting that a user has placed a first dimension value manipulator corresponding to the first dimension value into an expand mode; and
    in response to detecting the first dimension value manipulator is in the expand mode, expanding the first dimension value in the displayed visual representation of the table such that the sub-dimension values for the first dimension value are visible.

8. The method of claim 7, wherein when the table is initially generated, the sub-dimension values for the second dimension value that are visible are a first subset of all sub-dimension values for the second dimension value, the first subset including the sub-dimension values for the second dimension value that are determined to satisfy a predetermined relevancy threshold.

9. The method of claim 8, further comprising:
detecting that a sub-manipulator, corresponding to the sub-dimension values for the second dimension value, is in an expand mode; and
in response to detecting that the sub-manipulator is in the expand mode, displaying all the sub-dimension values for the second dimension value in the visual representation of the table.

10. The method of claim 7, further comprising:
receiving a request from a user, via the visual representation of the table, to add a dimension to the visual representation of the table; and
in response to the request to add a dimension, adding an additional dimension and at least one additional manipulator that allows a user to manipulate the visual representation of the table based on the additional dimension.

11. The method of claim 8, wherein changing which sub-dimension values are visible based on the rearranged hierarchy of the plurality of dimensions includes displaying a second subset of the sub-dimension values for the second dimension value.

12. The method of claim 7, further comprising:
receiving user input indicating a selection of at least two rows of the table;
dynamically performing a calculation based on data in the at least two rows; and
displaying a result of the calculation in the visual representation of the table.

13. A computer system for displaying a visual representation of a table, comprising:
one or more processors;
a memory coupled to the one or more processors and storing instructions which, when executed by the one or more processors, cause the one or more processors to perform operations comprising:
generating a visual representation of a table based on stored data, the table including a plurality of dimensions;
causing display of the visual representation of the table, wherein a first dimension value corresponding to a first dimension of the plurality of dimensions is collapsed when the table is initially generated, and a second dimension value corresponding to the first dimension of the plurality of dimensions is expanded when the table is initially generated, such that sub-dimension values for the first dimension value are not visible, and sub-dimension values for the second dimension value are visible, the sub-dimension values for the first dimension value and the sub-dimension values for the second dimension value corresponding to a second dimension of the plurality of dimensions, wherein the second dimension is a sub-dimension of the first dimension;
detecting a user input modifying a hierarchical relationship between the first and the second dimensions;
in response to detecting the user input, generating a rearranged hierarchy of the plurality of dimensions, the first dimension being a sub-dimension of the second dimension in the rearranged hierarchy; and
changing which-sub-dimension values are visible based on the rearranged hierarchy of the plurality of dimensions;
generating a metric value calculated based on the sub-dimension values of the first dimension value:
displaying the metric value corresponding to the first dimension value in the visual representation of the table;
detecting that a user has placed a first dimension value manipulator corresponding to the first dimension value into an expand mode; and
in response to detecting the first dimension value manipulator is in the expand mode, expanding the first dimension value in the displayed visual representation of the table such that the sub-dimension values for the first dimension value are visible.

14. The computer system of claim 13, wherein when the table is initially generated, the sub-dimension values for the second dimension value that are visible are a first subset of all sub-dimension values for the second dimension value, the first subset including the sub-dimension values for the second dimension value that are determined to satisfy a predetermined relevancy threshold.

15. The computer system of claim 14, the operations further comprising:
detecting that a sub-manipulator, corresponding to the sub-dimension values for the second dimension value, is in an expand mode; and
in response to detecting that the sub-manipulator is in the expand mode, displaying all the sub-dimension values for the second dimension value in the visual representation of the table.

16. The computer system of claim 13, the operations further comprising:
receiving a request from a user, via the visual representation of the table, to add a dimension to the visual representation of the table; and
in response to the request to add a dimension, adding an additional dimension and at least one additional manipulator that allows a user to manipulate the visual representation of the table based on the additional dimension.

17. The computer system of claim 14, wherein changing which sub-dimension values are visible based on the rearranged hierarchy of the plurality of dimensions includes displaying a second subset of the sub-dimension values for the second dimension value.

* * * * *